(12) United States Patent
Shalabi et al.

(10) Patent No.: US 7,278,109 B2
(45) Date of Patent: Oct. 2, 2007

(54) SYSTEM AND METHOD FOR DYNAMIC UPLOADING OF USER INTERFACE GENERATION LOGIC

(75) Inventors: Sami M. Shalabi, Arlington, MA (US); Miguel A. Estrada, Hollis, NH (US)

(73) Assignee: International Business Machines Corporation, Armonk, NY (US)

( * ) Notice: Subject to any disclaimer, the term of this patent is extended or adjusted under 35 U.S.C. 154(b) by 737 days.

(21) Appl. No.: 10/454,461

(22) Filed: Jun. 3, 2003

(65) Prior Publication Data

US 2004/0250213 A1  Dec. 9, 2004

(51) Int. Cl.
G06F 3/00 (2006.01)
G06F 3/048 (2006.01)
(52) U.S. Cl. .................... 715/762; 715/792
(58) Field of Classification Search ............. 715/733, 715/748, 744, 760, 751, 753, 758, 762; 709/203, 709/238, 245
See application file for complete search history.

(56) References Cited

U.S. PATENT DOCUMENTS 5,894,554 A * 4/1999 Lowery et al. ............. 709/203

OTHER PUBLICATIONS

Donald M Leslie, Transforming Documentation from the XML Doctypes used for the Apache Website to DITA: a Case Study, Publication Date Oct. 21, 2001, pp. 157-164.*
Donald M. Leslie, Using Javadoc and XML to Produce API Reference Documentation, Publication Date Oct. 20, 2002, pp. 104-109.*
Bishop et al., From Dated to Dynamic: A Campus Newsletter Unfolds as a Web Service, Publication Date Nov. 20, 2002, pp. 1-4.*
Miguel Estrada, et al., U.S. Appl. No. 09/752,115, filed Dec. 29, 2000, entitled "Method and System for Automatically Accessing, Processing, and Managing the Data in a Place", pp. 5-10, 18-23, 143-156.

* cited by examiner

Primary Examiner—Weilun Lo
Assistant Examiner—Truc T. Chuong

(57) ABSTRACT

A system and method for generating a user interface by, responsive to end user input, building a text file including data source and formatting logic; instantiating an uploadable skin; binding the text file to the skin; responsive to command from the end user, dynamically uploading the skin from a user terminal to a place server; processing and storing the skin in a place database; responsive to end user request, selecting and rendering the user interface in accordance with the skin.

14 Claims, 14 Drawing Sheets

REQUEST PROCESSING

SYSTEM AND METHOD FOR DYNAMIC UPLOADING OF USER INTERFACE GENERATION LOGIC

CROSS REFERENCES TO RELATED APPLICATIONS

U.S. patent application

Ser. No. 10/334,261, filed 31 Dec. 2002, now U.S. Pat. No. 6,904,439, issued 5 Sep. 2005, entitled "SYSTEM AND METHOD FOR AGGREGATING USER PROJECT INFORMATION IN A MULTI-SERVER SYSTEM";

Ser. No. 10/334,296, filed 31 Dec. 2002, pending, entitled "SYSTEM AND METHOD FOR CENTRAL REFRESH OF PLACE OBJECTS";

Ser. No. 10/334,268, filed 31 Dec. 2002, now U.S. Pat. No. 7,089,231, issued 8 Aug. 2006, entitled "SYSTEM AND METHOD FOR SEARCHING A PLURALITY OF DATABASES DISTRIBUTED ACROSS A MULTI SERVER DOMAIN";

Ser. No. 09/752,120, filed 29 Dec. 2000, now U.S. Pat. No. 7,028,262, issued 11 Apr. 2006, entitled "METHOD AND SYSTEM FOR DESIGNING A THEME AND ASSOCIATING IT WITH A COLLABORATION SPACE USER INTERFACE (as amended); and Ser. No. 09/752,115, filed 29 Dec. 2000, now U.S. Pat. No. 6,744,447, issued 1 Jun. 2004, entitled "METHOD AND SYSTEM FOR AUTOMATICALLY ACCESSING, PROCESSING, AND MANAGING THE DATA IN A PLACE", are assigned to the same assignee hereof and contain subject matter related, in certain respect, to the subject matter of the present application. The above identified patent applications are incorporated herein by reference.

BACKGROUND OF THE INVENTION

1. Technical Field of the Invention

This invention relates to user interface generation. More particularly, it relates to dynamic uploading of user interface generation logic by users at a client browser.

2. Background Art

In a typical client/server system, the functionality available to each user via remote terminals may be customized in accordance with the needs and authorization of the user and/or entity. Terminals may access the system using, for example, browser software technology or other electronic accessing methods. In general, reports and other information may be presented to a user in a user interface (UI) using known web page formatting techniques.

A typical user interface, such as the IBM® Lotus® QuickPlace® user interface, includes a sidebar table of contents (TOC), page title, author and modified field, actions bar, logo, path, page content, and actions buttons, such as quick search, advanced search, what's new, chat, notify, print, tutorial and help. Each of these is customized by using tags or selectors which deal with borders, background, text, and so forth, in accordance with a style sheet.

Skins control everything about the user interface, including layout and style. Layout defines the positioning of components on the screen. Style defines the form and colors of those components. Changes to the user interface such as editing a skin can be made via a browser using Web authoring tools such as an HTML editor. In making such changes, a standard default style sheet is output with a theme, so that one need only to specify the selectors that are to be changed. Undefined properties will fall back to those defined in the default style sheet.

There is a need in the art for a system and method which enhances the upload of skin components so that they may contain user interface logic and point to Java code.

Domino, IBM, the IBM Logo, Lotus, Notes, QuickPlace are trademarks of International Business Machines in the United States, other countries, or both.

OBJECTS AND SUMMARY OF THE INVENTION

It is an object of the invention to provide a system and method for uploading skin components containing user interface logic and pointers to code.

A system and method is provided for generating a user interface by, responsive to end user input, building a text file including data source and formatting logic; instantiating an uploadable skin; binding the text file to the skin; responsive to command from the end user, dynamically uploading the skin from a user terminal to a place server; processing and storing the skin in a place database; responsive to end user request, selecting and rendering the user interface in accordance with the skin; the interface logic including an object oriented class for retrieving extensible markup language code for processing the skin component, and further including an extensible stylesheet language markup.

Other features and advantages of this invention will become apparent from the following detailed description of the presently preferred embodiment of the invention, taken in conjunction with the accompanying drawings.

BEST MODE FOR CARRYING OUT THE INVENTION

In accordance with the preferred embodiment of the invention, there is provided a system and method for user interface generation. By binding data sources and formatting logic through an uploadable skin, user interface generation logic may be dynamically uploaded by end users at a client browser with or without administration or programmer access to the place server.

In accordance with an aspect of the invention, end users are able to upload skins using the user interface (UI). This skin is a piece of text that contains tags. These tags are used to represent both rendering and data binding logic. Since this is end user uploadable, users and programmers can add code and rendering logic while the server is running and do so without programmer or administrator access to the server.

Figure 1:
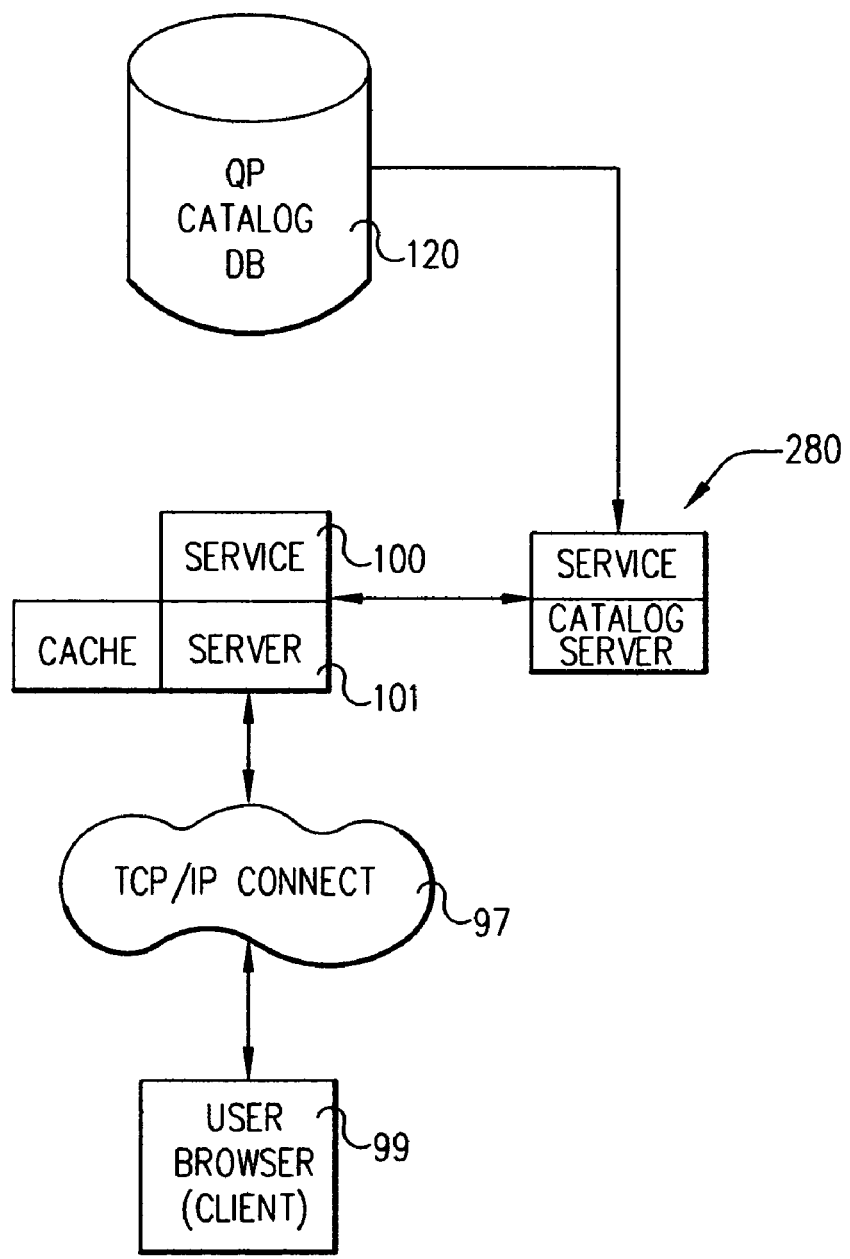
FIG. 1 is a high level system diagram illustrating a typical system configuration in accordance with the preferred embodiment of the invention.
Figure 2:
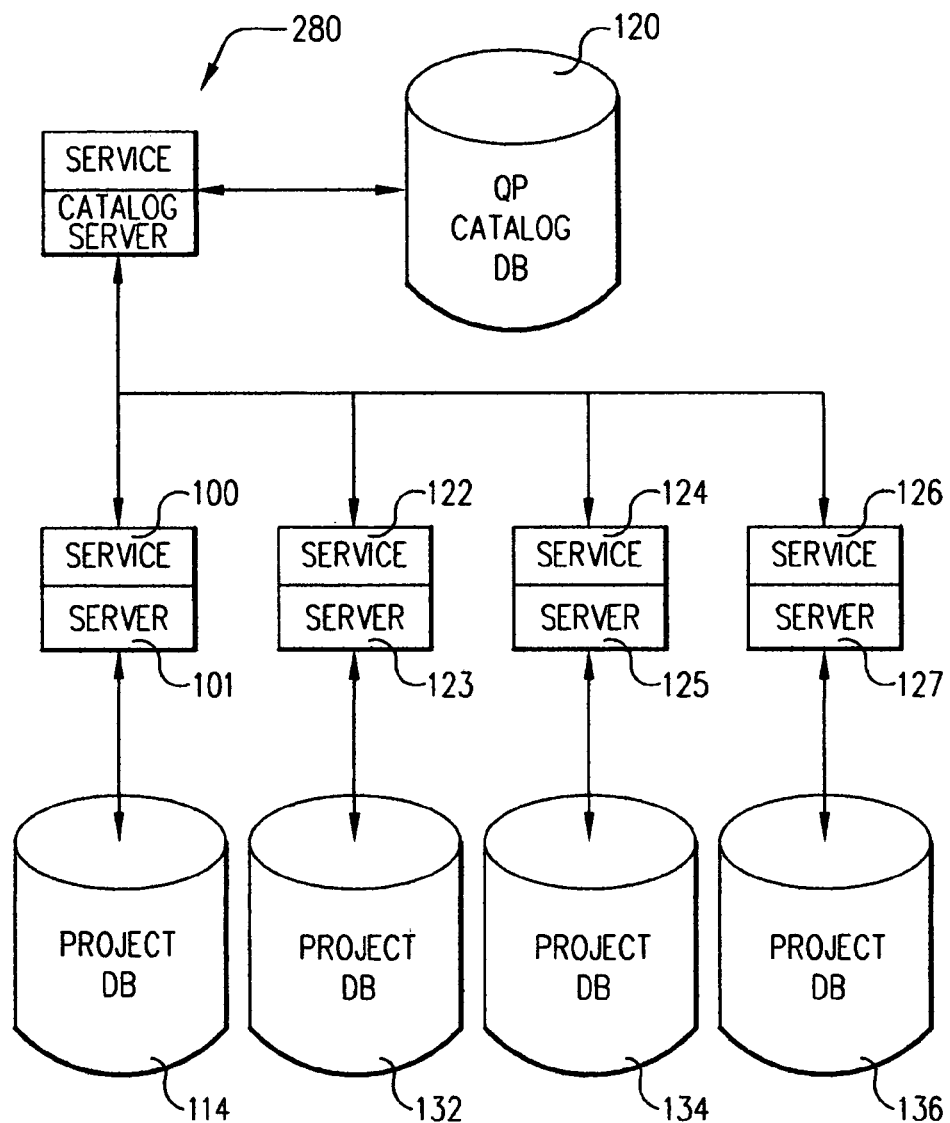
FIG. 2 is a high level system diagram illustrating components of a multi-server system environment.

Referring to FIGS. 1 and 2, catalog 120 is a database, such as a QuickPlace database, for aggregating information about projects, such as QuickPlaces, or project databases, 114, 132, 134, 136, in a multi-server system environment, including service 100/server 101, 122/123, 124/125, and 126/127, communications link 97, and one or more client terminals, such as client, or user browsers, 99. Host catalog server/service 280 is a Domino server with QuickPlace installed which has been configured to host catalog database 120 and which is accessible to QuickPlace servers 101 in the enterprise through the Notes RPC (tcp port 1352) and http protocols.

Throughout this specification, except as otherwise apparent from context, the generic term "project" and more specific terms "place" or "QuickPlace" are used substantially interchangeably. Place and QuickPlace are specific examples of projects. Similarly, "host catalog" and "QuickPlace catalog" are substantially equivalent terms.

In accordance with the preferred embodiments of the data structures of the invention, places exist on multiple servers and server clusters.

The functionality available to each user via remote terminals 99 may be customized in accordance with the needs and authorization of the user and/or entity. Terminals 99 may access the system using, for example, browser software technology or other electronic accessing methods known to those of skill in the art. In general, reports and other information displayed to the end user at terminal 99 may be displayed using known web page formatting techniques.

The present invention relates to an improvement in managing the user interface presented at client terminal 99.

Communication link 97 links remote terminals 99 to server 101. Link 97 may be a hardwired link, such as a telephone line, coaxial cable, digital data line, or the like, or a wireless link such as a radio frequency or infrared communications link, or the like.

As illustrated in FIG. 1, a QuickPlace service 100 represents a group a servers 101 that are able to communicate with each other through a network, and work together to provide function (such as project creation, search across projects and servers, and get aggregate view across all servers and projects).

In a preferred embodiment, this service is implemented in an abstract sense, in that each server 100 implements a notion of service, which in this sense is a multi-server deployment of QuickPlace servers 101 that can be treated as a consistent unit of service for administration and in the user interface. A QuickPlace service 100 comprises multiple QuickPlace servers 101 and/or QuickPlace clusters, which: (1) share the same IBM® Lotus® Domino™ certifier; (2) share the same user directory and authentication system; (3) are on the same user network (i.e., are not separated by a firewall); and (4) are administered by the same administration team. These constraints are enough to ensure across the service that: (1) servers 101 can be configured consistently; (2) servers 101 can communicate and share data with each other; (3) user identities are in the same name space and do not collide; and (4) single sign on authentication can be implemented.

Figure 3:
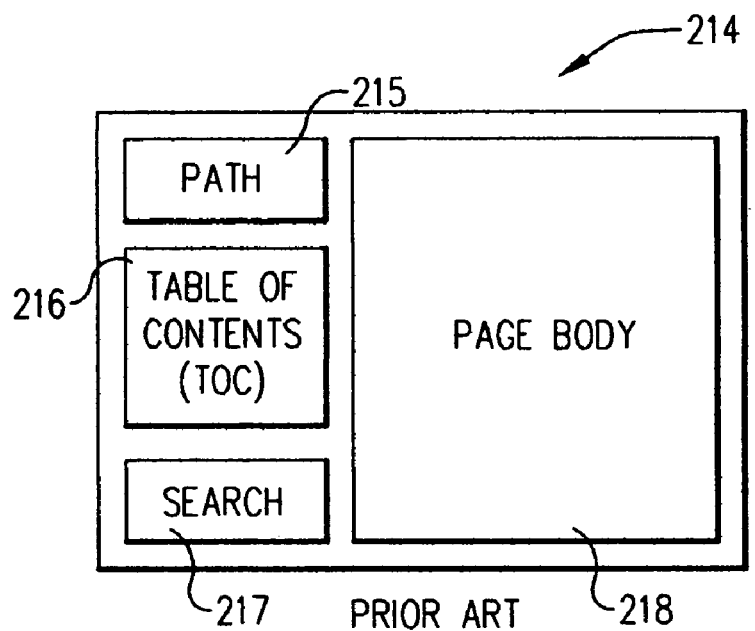
FIG. 3 is a diagrammatic representation of a prior art user interface.

Referring to FIG. 3, selected components of a prior art user interface 214 for display at, for example, client browser 99 include path display 215, table of contents (TOC) 216, a search panel 217, and a page body 218.

Figure 4:
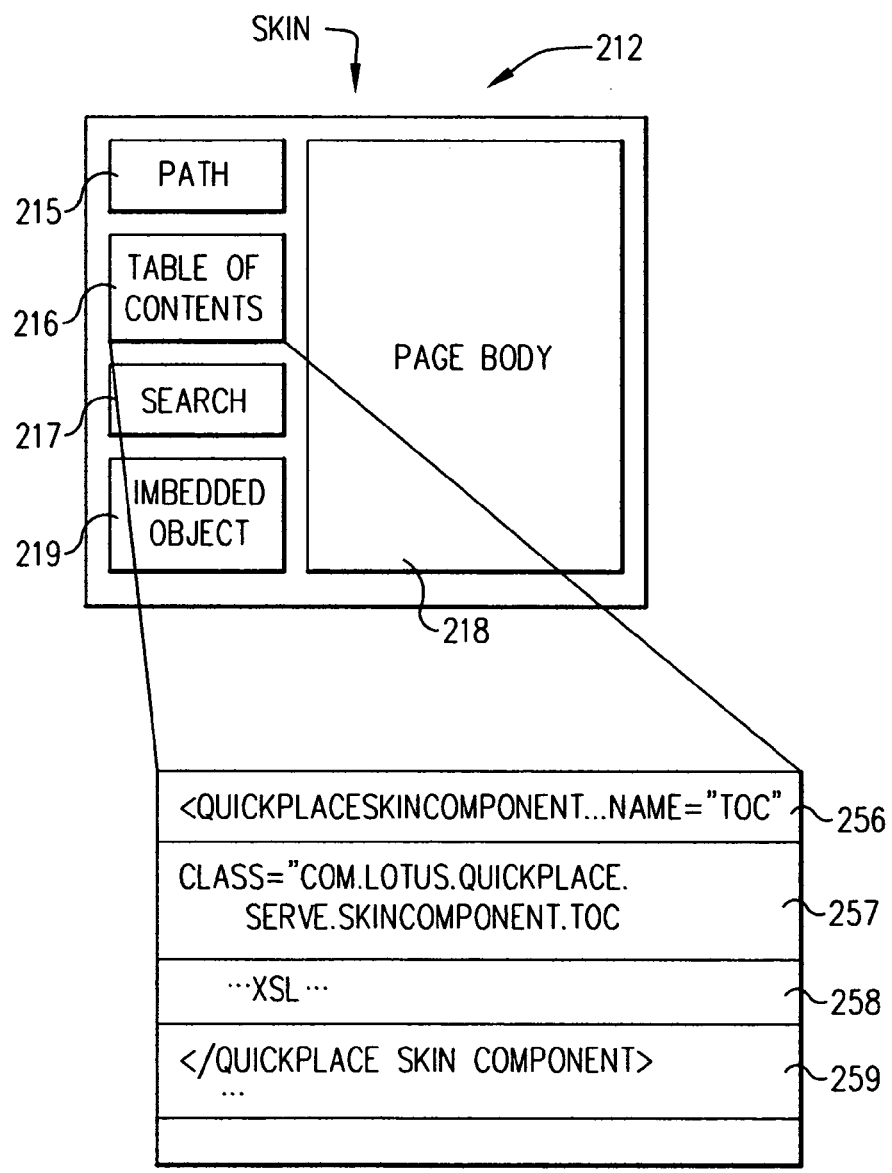
FIG. 4 is a diagrammatic representation of a user interface, or skin, illustrating a plurality of skin components in accordance with the preferred embodiment of the invention.

Referring to FIG. 4, in accordance with the preferred embodiment of the invention, a system and method is provided for dynamic (that is, "on the fly") uploading of UI generation logic by end users who do not need administrator or programmer rights to the server. User interface (also referred to as a skin) 212 includes a plurality of skin components, including path 215, TOC 216, search panel 217, and page body 218, as in FIG. 3, and also an imbedded object 219. All of these skin components 215-219 may be dynamically generated, as will be more fully described hereafter.

By way of example, skin component TOC 216 is represented by an XML element which opens at statement 256 and closes at statement 259. Class statement 257 represents a skin component, or imbedded object, tag. Extensible stylesheet language (XSL) statements 258 complete the skin component, are described hereafter in connection with Tables 1-3. XSL is an example of an XML application that transforms other XML documents into a form that is viewable in web browsers.

Figure 5:
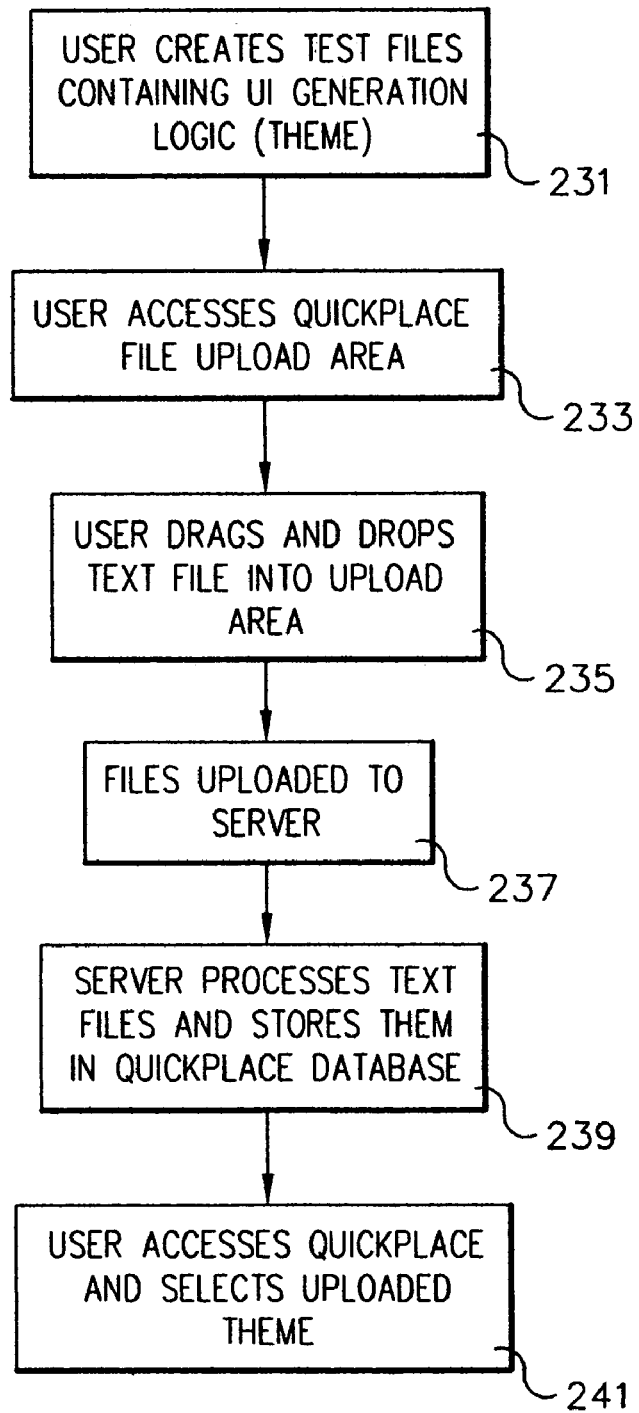
FIG. 5 is a high level flow chart representation of the preferred embodiment of the invention.

Referring to FIG. 5, an overview of the process for generating a user interface 212 includes, in step 231, the user creating text files containing UI generation logic, in step 233 accessing a QuickPlace theme file upload area, in step 235 dragging and dropping the text file containing the UI generation logic, or theme, in that upload area, which file is then uploaded in step 237 to QuickPlace server 101 where it is processed and stored in database 114 in step 239 from whence, in step 241, it may be accessed by the end user to generate user interface 212. Examples of UI generation logic, created by a user at client 99 in text files in step 231 and uploaded to server 101 in step 237 are set forth in Table 1, XSL for Rendering XML in a Skin Component. Compiled versions of Table 2, Java Code for the TOC Class is already installed on the server, as is also Table 3, Java Code for Generating XML.

Figure 6:
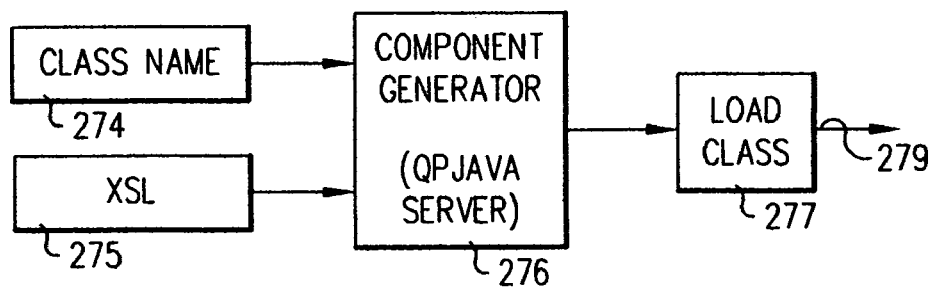
FIG. 6 is diagrammatic representation of a component generator.
Figure 7:
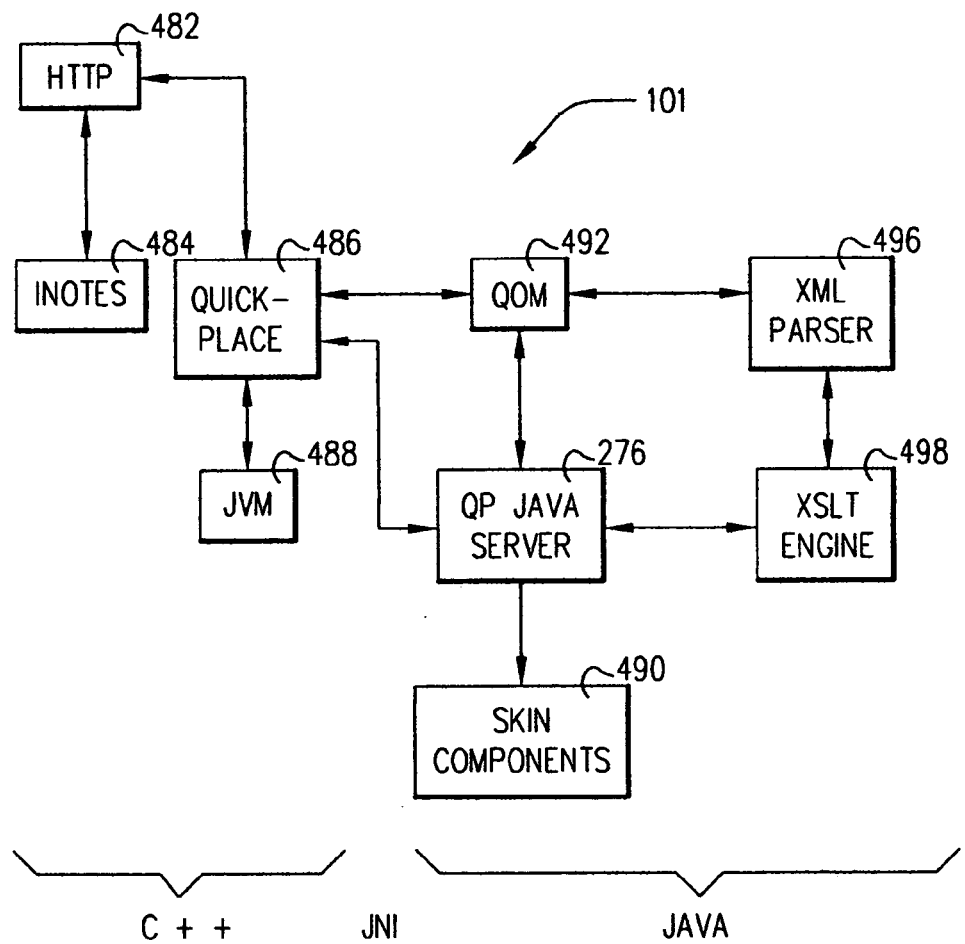
FIG. 7 is a system diagram illustrating the architecture of server 101 of FIGS. 1 and 2 according to an exemplary embodiment of the invention.

Referring to FIG. 6, class name 274 (an example of which is called at Table 1, line 2) is processed by component generator or server 276 (see also FIG. 7). Server 276, also referred to as skin component processor or QP Java server, processes class name 274 with reference to XSL 275 (an example of which is set forth in Table 1, lines 3-20) to produce a load class 277 for output 279. Component generator, or server, 276, a specific example of such being a Java server, executes a load class operation, dynamically loading class 274 which is passed to it, as will be more fully described hereafter in connection with FIG. 13.

In this way, class name 274, XSL 275 and the location of server 276 within a page can be changed on the fly without restarting any place servers 101. The process of FIG. 5 can happen several times. This results in dynamic changes in class name 274 and XSL 275 as these values come from the file that is uploaded in step 237. Therefore, in accordance with the preferred embodiments of the invention dynamic changes are made to these two values class name 274 and XSL 275 by end users without having to restart server 101, and without administrator intervention.

In Tables 1-3, by way of example, XSL is used for rendering XML in a table of contents (Toc) skin component.

In the example of Table 1, line 1 gives the name of the desired component, in this case the table of contents (Toc). Line 2 defines the skin component class 277 with the code to be loaded, and in this example calls com.lotus.quickplace.server.skincomponents.Toc, which is set forth in Table 2. Table 2 is the Java code for the table of contents, and identifies and calls a class producer TocProducer (Table 2, lines 21,22). The producer called is set forth in Table 3. Table 3, the producer, goes (lines 26-34) to the server to retrieve XML representation for the TOC (roomToc, line 34), which at lines 36,37 it appends to a transitional XML document (toXML(doc)), or skin components 490.

Lines 3-20 of Table 1 illustrate XSL statements 258 (FIG. 4), a standard formatting language, that are used to render the skin 212 (in this case, the table of contents component 216 of skin 212). Thus, Table 1 illustrates a skin component definition that contains user interface (UI) rendering logic, or user interface generation logic, and provides the ability to upload skin components 490 that contain UI logic and point to Java code. An exemplary process for uploading skin components 490 is described in copending application Ser. No. 09/752,120, now U.S. Pat. No. 7,028,262 at Col. 29, line 6 to Col. 30, line 15 (in the patent version) as follows:

Modifying an Existing Theme

A QuickPlace theme is customized by beginning with the theme closest to what is desired, extracting the HTML source files for the theme, customizing them, and unloading the modified files as a custom theme.

This process is as follows, from the QuickPlace user interface: 1. Choose Customize--Decorate--Click here to choose a theme. 2. Select the theme that most closely represents the look and layout desired for the QuickPlace and click the Done button. QuickPlace applies the selected theme. The user then proceeds: 3. Select Customize--Custom Themes--New Theme. 4. Enter a name for the theme being created and click the Done button. QuickPlace returns to the Custom Themes page. 5. Click the theme name specified in step 4 to edit it. QuickPlace displays the Edit Theme page with a file associated with each layout.

Viewing an HTML File

To view or modify the source code for a layout, the file is dragged to the desktop and opened in an HTML editor. If using an editor such as HomeSite that supports in-place editing, right-click a file name and choose the editor from the right-click menu. This opens the editor within QuickPlace. Changes made to the HTML file are automatically uploaded when saving and exiting the editor.

The original source file can also be modified in an HTML editor, and the Reload button clicked from the Edit Theme page to reload the modified file.

Creating a Custom Theme

To create a custom theme, the existing layout files are modified or new layout files created. In either case, a name is assigned and the layout files uploaded. The procedure is as follows:

Modifying Layout Files

1. Choose Customize--Custom Themes 2. Click the New Theme button. 3. Enter a title and an optional description for the new theme. 4. Choose a layout to modify and click the Browse button to locate the HTML file for the layout. 5. Select the file from the file system and click OK to upload the .htm file for the layout. 6. Repeat to upload files for other layouts or for the theme style sheet. 7. Click the Done button to save the custom theme.

Generating Layout Files

As a theme is developed, QuickPlace can take the code from one layout and apply it to all layouts for which a file has not been explicitly supplied. This is a shortcut for applying a common look and feel to multiple layouts.

This feature also allows one to develop a custom theme in stages, replacing generated layouts with custom files as the theme progresses.

To generate layout files based on a layout: 1. Choose a layout and click the Browse button to locate the HTML file for the layout. 2. Select the file from the file system and click OK to upload the .htm file for the layout. 3. Click the Generate button to populate the other layouts with files based on this file. 4. Modify the generated files as desired. 5. Click Reload to upload a modified file. 6. Click the Done button to save the custom theme.

Table 2 is the code for the Toc class which extends a SkinComponent 219 class, and Table 3 is the code implementing a producer for generating the XML needed to render the component of Table 2. This generated XML is input to the XSL 275 defined in lines 3-20 of Table 1. A producer is an object responsible for producing a document object model (DOM) XML tree for input to XSL. Required producer interfaces include init, destroy, and produce.

An XSL stylesheet element is a root element for XSLT stylesheets. An XSL template top-level element is key to all of XSLT. An XSL template match attribute contains a pattern against which nodes are compared as they are processed (see FIG. 11, step 564). If the pattern matches a node, then the contents of the template are instantiated and inserted into an output tree.

Reference is made to David Flanagan, *Java in a Nutshell* (Sebastopol, Calif.: O'Reilly & Associates, Inc., 1996), and Elliotte Rusty Harold & W. Scott Means, *XML in a Nutshell* (Sebastopol, Calif.: O'Reilly & Associates, Inc., 2001), for descriptions of Java, XML and related languages and interpretation of the code examples in the Tables of this specification.

TABLE 1

XSL for Rendering XML in a Skin Component

```
<QuickPlaceSkinComponent name=Toc xsl=yes
class="com.lotus.quickplace.server.skincomponents.Toc"
    <xsl:stylesheet xmlns:xsl="http://www.w3.org
    /1999/XSL/Transform" version="1.0">
        <xsl:template match="toc">
            <div>
                <xsl:apply-templates select="toc_entry"/>
            </div>
        </xsl:template>
        <xsl:template match="toc_entry">
            <xsl:element name="A">
                <xsl:attribute name="HREF">
                    <xsl:valueof select="url"/>
                </xsl:attribute>
                <xsl:value-of select="title"/>
            </xsl:element>
            <b>(Type: <xsl:value-of select="type"/>)</b>
            <BR/>
        </xsl:template>
    </xsl:stylesheet>
</QuickPlaceSkinComponent>
```

TABLE 2

JAVA CODE FOR THE TOC CLASS

```
public class Toc extends SkinComponent
{
  /**
   *
   **/
  public Toc( )
  {
    super( );
    i_name = "toc";
  }
  /**
   *
   **/
  public void init( SkinComponentConfig config)
  {
    super.init( config);
    trace( "Calling init toc component");
  }
  public String getProducer( )
  {
    return "com.lotus.quickplace.server
    .producer.TocProducer";
  }
}
```

TABLE 3

JAVA CODE FOR GENERATING XML

```
public class TocProducer implements Producer
{
  static private Category c_logger =
  Category.getInstance( TocProducer.class.getName( ));
  public void trace( String s)
  {
    c_logger.debug( s);
  }
  public void init( )
  {
    trace( "inited");
  }
  public void destroy( )
  {
    trace( "destroyed");
  }
  /**
   * This method generates a DOM tree that
   * contains the generated data.
   */
  public void produce( SkinComponentRequest req, Document doc)
    throws Exception
  {
    trace( "getting toc for " + req.getPlaceName( ) +
    " " + req.getRoomName( ));
    QPSession session = new QPSession( );
    QPServer server = session.getLocalServer( );
    QPPlace place = server.getPlace(
      req.getPlaceName( ));
    QPRoom room = place.getRoom(
      req.getRoomName( ));
    QPToc roomToc = room.getToc( );
    doc.getDocumentElement( ).appendChild(
    roomToc.toXML( doc));
  }
}
```

Referring to FIG. 7, the architecture of server 101 (FIG. 1) is expanded to illustrate the architectural components of a exemplary embodiment of the invention for "on the fly", or dynamic, uploading of UI generation logic by end users without restarting any servers. Server 101 includes C++ components HTTP 482, iNotes 484, QuickPlace 486, Java virtual machine (JVM) 488, and Java components QP Java server 276, QuickPlace object model (QOM) 492, XSLT engine 498, skin components object 490, and XML parser 496.

A Java™ Native Interface (JNI) interfaces the C++ and Java components. JNI is a standard programming interface for writing Java native methods and embedding the Java virtual machine 488 into native applications. It provides for binary compatibility of native method libraries across all Java virtual machine implementations on a given platform.

In this exemplary embodiment, JVM 488 version 1.1.8 is loaded by QuickPlace DLL and has its classpath defined in notes.ini (JavaUserClasses). Quickplace Java server 276 represents the Java component of place server 101, its code being located in the server's classpath. One QuickPlace Java (QPJ) server 276 object is created and instantiated for the life of server 101, and is responsible for the processing of skin 212 components 215-219. QuickPlace object model (QOM) 492 code is located in the server's classpath, contains abstractions for QuickPlace objects (QPServer, QPPlace, QPRoom, etc.), provides implementations of objects in C++ using JNI, and does data read-write operations in bulk, or transactional, mode. QOM 492 object text representation is XML. XML parser 496 is, in this exemplary embodiment, a Xerces Version 1.2.1 parser, and XSLT engine 498 is a Xalan Version 2.0.1 engine, both using libraries located in the server's classpath.

Figure 8:
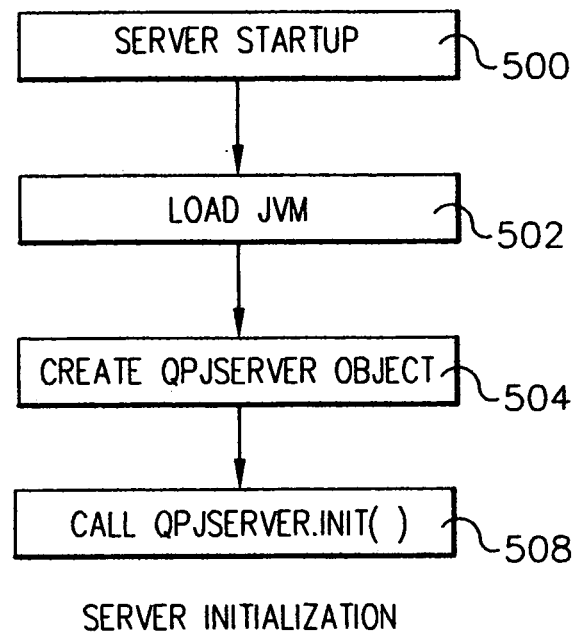
FIG. 8 is a flow chart illustrating initialization of a server component of FIG. 7.

Referring to FIG. 8, C++ code bridges to Java. QuickPlace server 486 executes to instantiate server 101. Server 276 initialization begins with startup step 500. In step 502 JVM 488 is loaded and in step 504 QPJ server object 276, the Java component of server 101, is created. In step 508 a call made to QPJServer( ), which is QP Java server 276. QPJServer.init( ) executes to initialize Java statics and other Java objects, including QOM 492, XML parser 496, and XSLT engine 498.

Figure 9:
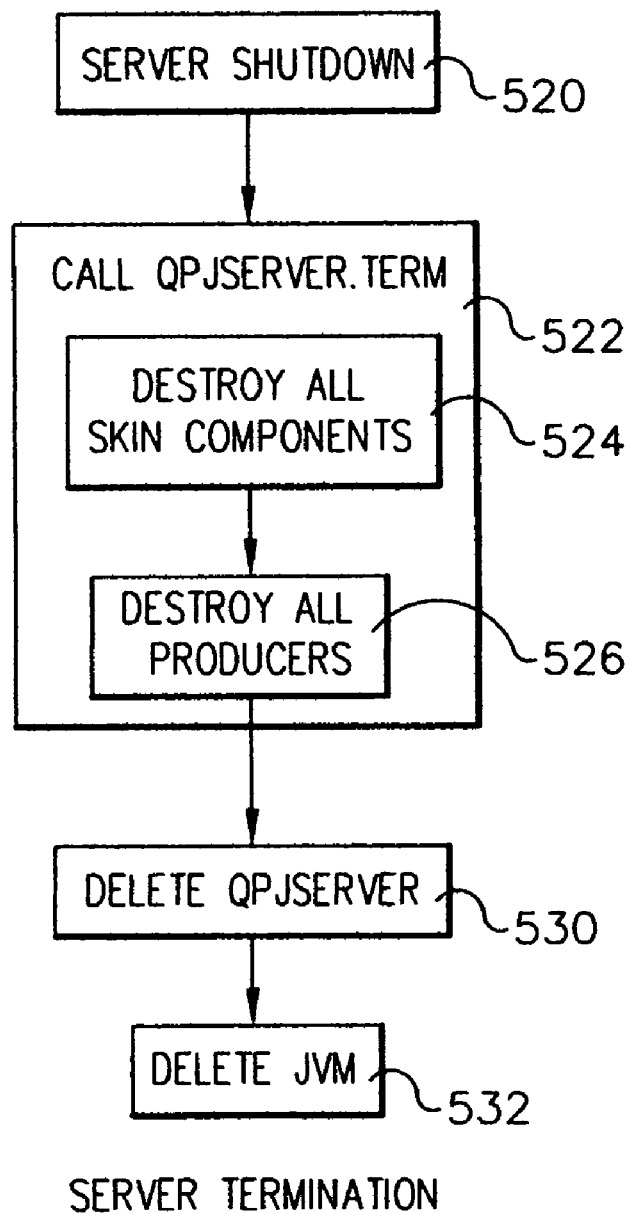
FIG. 9 is a flow chart illustrating termination of the server component of FIG. 7.

Referring to FIG. 9, server 101 termination is described. In server shutdown step 520, QuickPlace server 486 calls QP Java server 276 termination, or QPJServer.term 522 which executes to destroy, or close, all skin components in step 524 and all producers in step 526. Thereafter, QPJServer 276 is deleted in step 530, and JVM 488 deleted in step 532.

Figure 10:
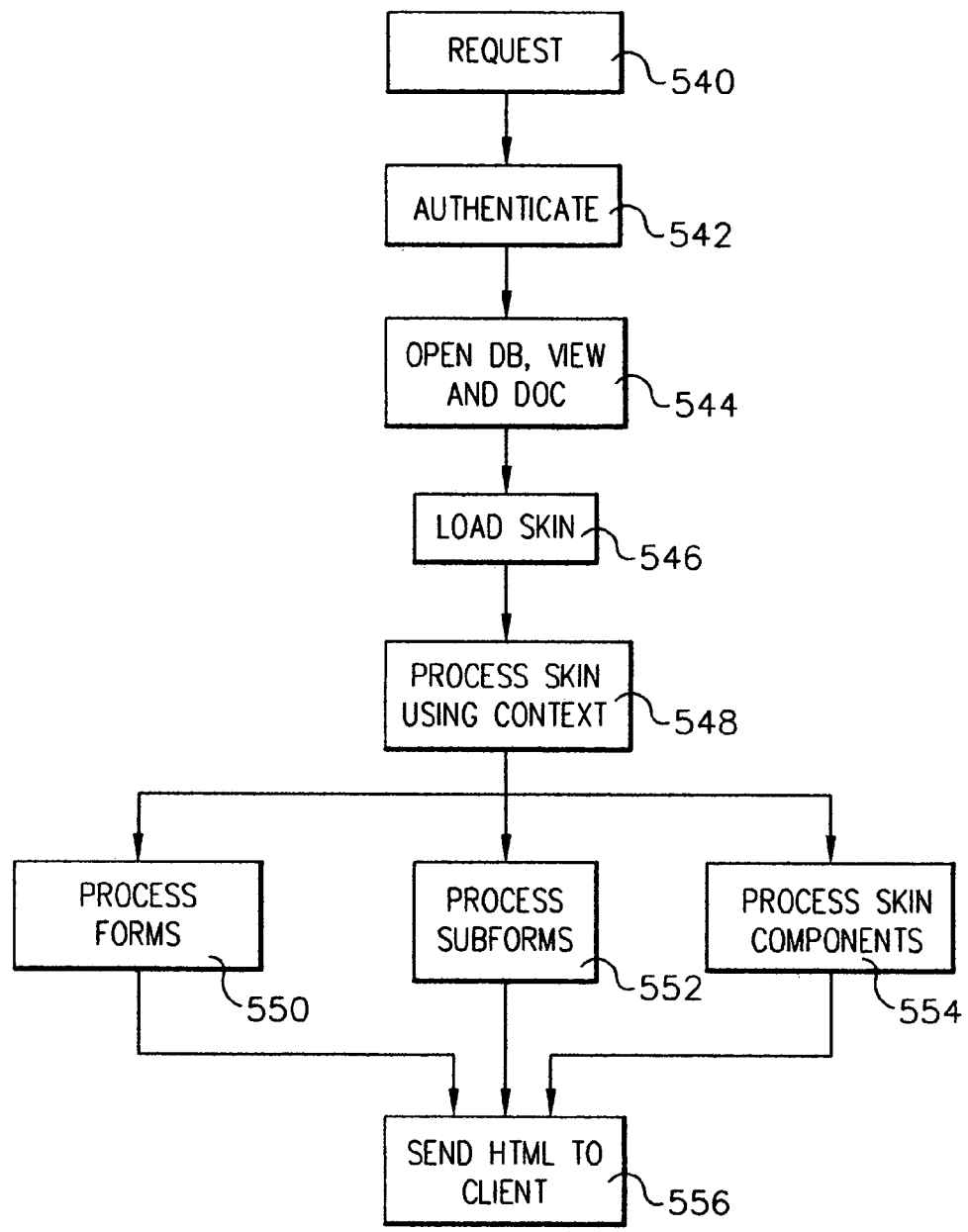
FIG. 10 is a flow chart illustrating request processing by the server component of FIG. 7.

Referring to FIG. 10, while instantiated, Java server 276 processes requests 540 received from a user at user terminal 99, such as when a user accesses a web page. Java server 276 authenticates the user in step 542 and opens needed databases 114, views and documents in step 544. In step 546 skin 212 (FIG. 4) is loaded from database 114 by the process of FIG. 5, and in step 548 processed using context, including process forms step 550, process subforms 552, and process skin components 554. In step 556 the resulting HTML is sent to client 99 for rendering as skin 212. Context refers the appropriate one of five skin methods, including document read, document edit, folder list, headline folder, and slide show folder for a theme, as is described in application Ser. No. 09/752,120.

Figure 11:
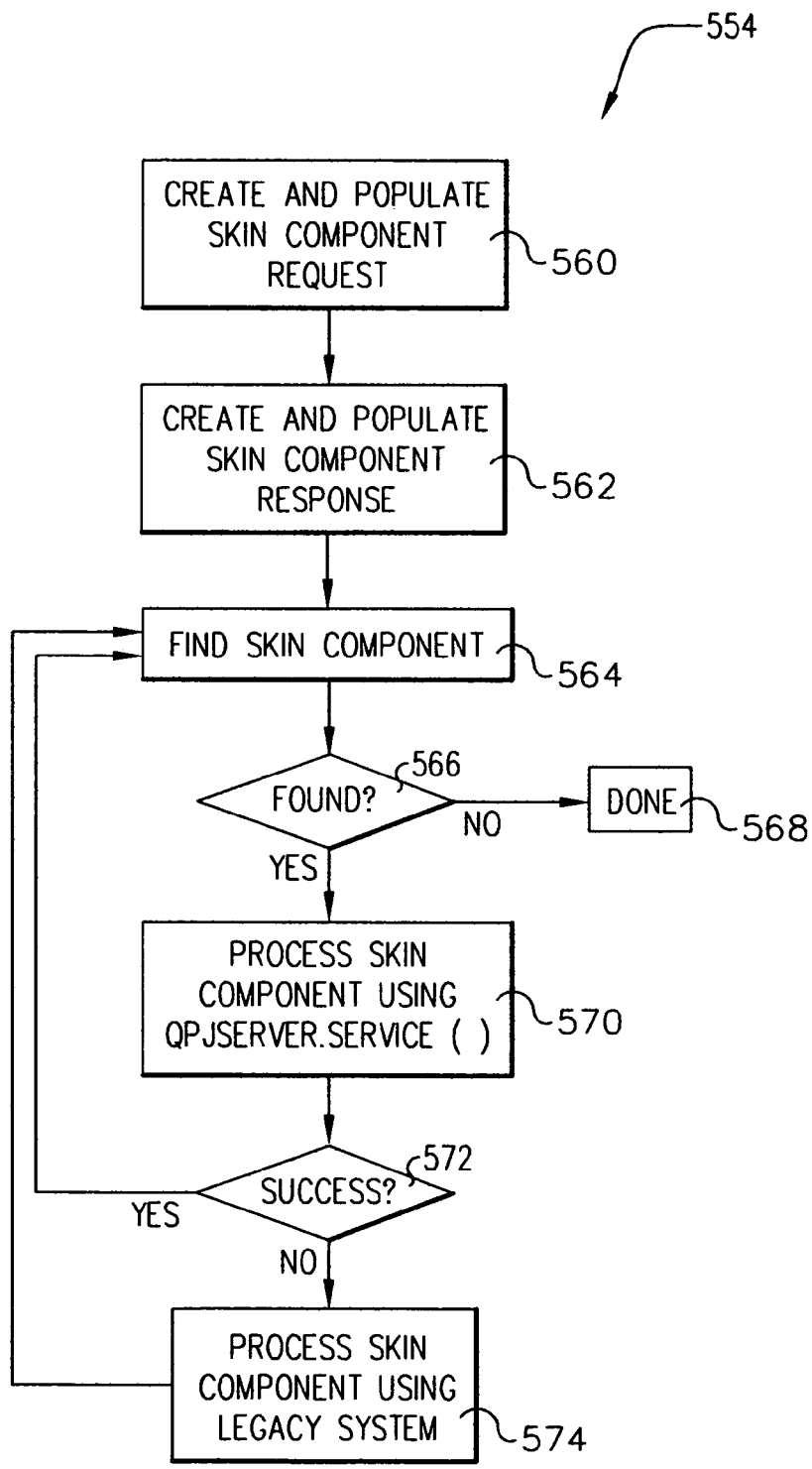
FIG. 11 is a flow chart illustrating a skin component processing step of FIG. 10.

Referring to FIG. 11, process skin components step 554 executes in step 560 by server 276 creating and populating a skin component request and in step 562 by creating and populating a skin component response. A skin component request is an object that represents all the request data needed to process a skin component. A skin component response contains data passed between server 101 and client 99. Skin component request and skin component response from steps 560 and 562, respectively, are transient objects fed into skin components objects 490.

In steps 564, 566, a search for each skin component 215-219 of skin 212 is made. This is done by finding in code for skin 212 the class attribute of a QP skin component tag—such as that of statement 257 of FIG. 4. An example of such a tag is found at line 1 of Table 1. When no more skin component tags are found, execution is done, step 568. If found, in step 570 the skin component is processed by Java system 276, using the QPJServer.service( ) method described in connection with FIG. 10. If processing in step 570 is determined in step 572 to have been successful, processing returns to step 564 to search for the next skin component 215-219. If not successful, in step 574 the skin component is processed, if at all, using some other process, and then processing returns step 564. In this manner, all skin component tags are found and processed, either by Java server 276 or some legacy method.

The process skin component method 554 of FIG. 11 is responsible for processing skin components 215-219 using a request/response model (steps 560, 562). There exists one instance of method 554 per server 101. Required methods include service(request, response), init(config), destroy( ), and getProducer( ).

Figure 12:
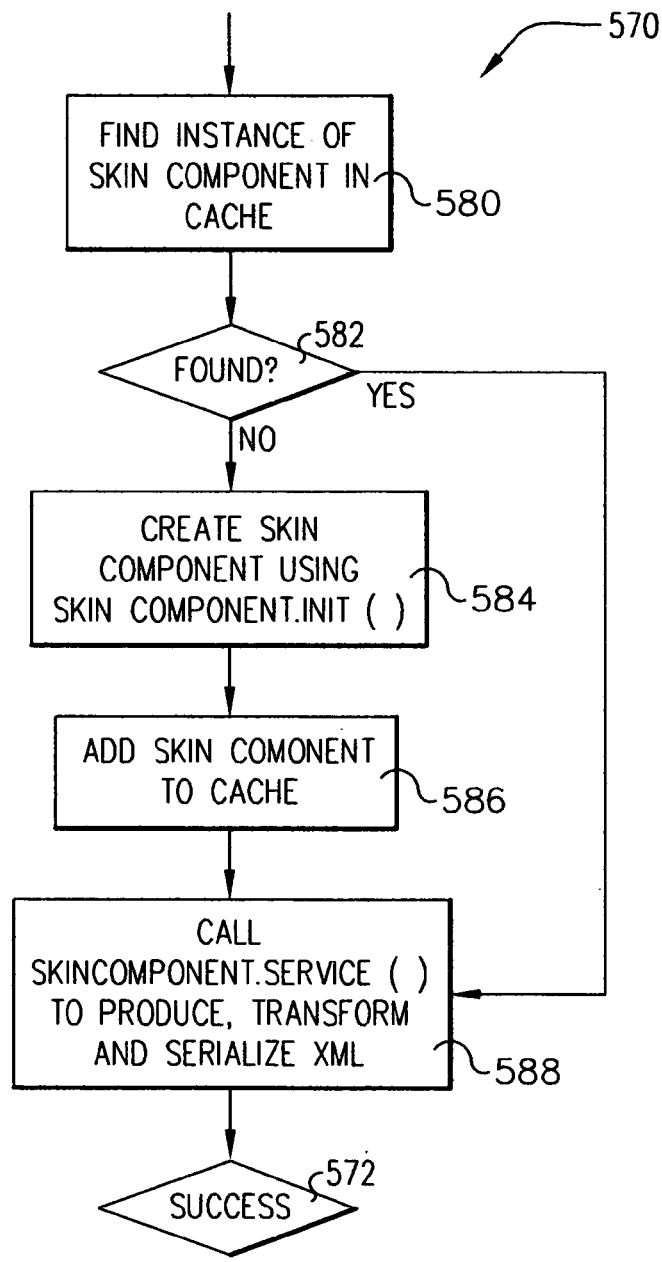
FIG. 12 is a flow chart illustrating a skin component processing step of FIG. 11.

Referring to FIG. 12, skin component processing step 570 includes, in steps 580, 582, searching in cache 93 (FIG. 1) for an instance of the skin component and, if not found, in steps 584, 586 and 588 creating a skin component using skincomponent.init( ), adding the resulting skin component to skin components 490 in cache 93, and in step 588 calling skincomponent.service( ) to produce, transform and serialize the XML output, as will be described hereafter. That completed, success step 572 (FIGS. 11 and 12) is reached.

Figure 13:
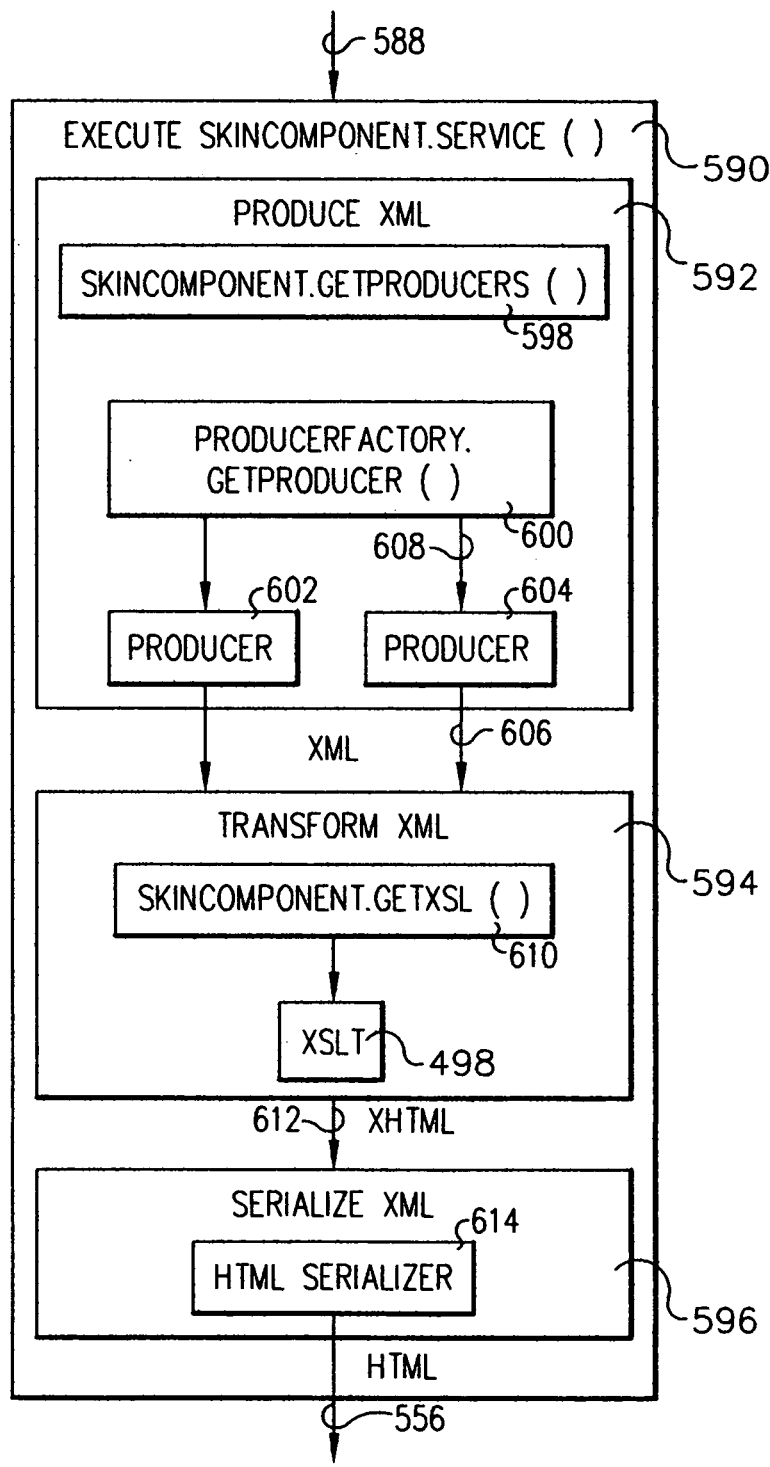
FIG. 13 is a flow chart illustrating the steps executed by skinComponent.service( ) of FIG. 12 for producing, transforming, and serializing XML.

Referring to FIG. 13, the call to skincomponent.service( ) of step 588 is described in further detail. Processing in step 590 of skincomponent.service( ) by skin components 490 includes step 592 for producing XML, step 594 for transforming the XML to XHTML, and step 596 for serializing XHTML to provide HTML output 556 which is sent to browser 99 by server 101. Step 592 includes in step 598 a call to skincomponent.getProducers( ), which in step 600 calls ProducerFactory.getproducer( ) to get producers 602, 604. Table 2 lines 25-26 is an example of step 598. Step 600 is further described hereafter in connection with FIG. 14. Producer 604, for example, produces XML output 606, which is fed to transform XML step 594. An example of producer 604 is the TOC 216 producer of Table 3, and an example of XML output 606 is illustrated in Table 3, lines 36-37. Other producers 602, for example, exist for skin components 215, and 217-219. In step 610 skincomponent-.getxsl( ) is called to transform XML 606 through XSLT engine 498 into XHTML 612. XHTML 612 is fed to HTML serializer 614 which, in step 596, serializes XHTML 612 into HTML 556 for serving to client 99. Step 610, for examples, returns text in Table 1, lines 3-20.

Producer 604 and XSLT 498 can be defined dynamically.

Figure 14:
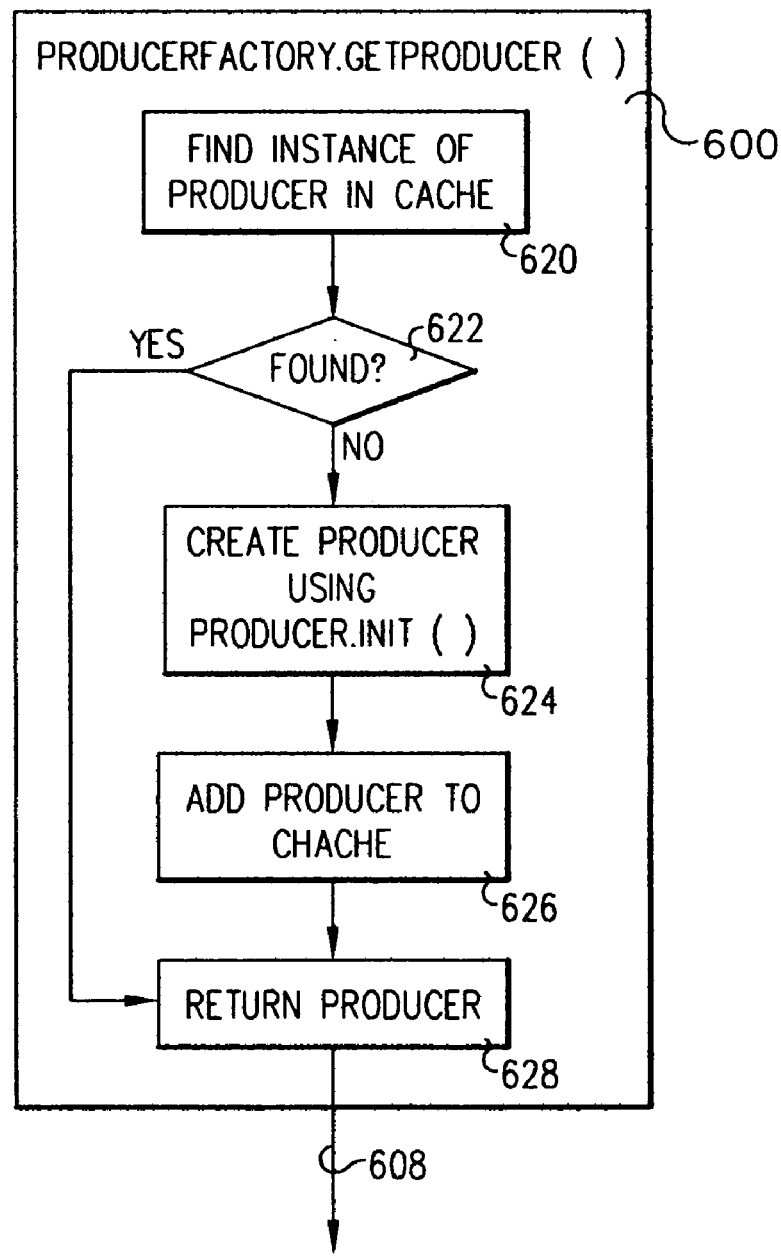
FIG. 14 is a flow chart illustrating the step of FIG. 13 for getting and loading XML producers to cache.

Referring to FIG. 14, ProducerFactory.getproducer( ) step 600 (FIG. 13) executes search step 620 to find in cache 93 an instance of the required producer. If, in step 622, it is determined that the required producer 604, for example, is found, in step 628, as represented by line 608, it is returned. If not found, producer.init( ) creates a producer in step 624, which in step 626 is added to cache 93. In this manner, producers are saved to cache 93 just as are skin components.

ALTERNATIVE EMBODIMENTS

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a magnetic or optical tape or disc, or the like, for storing signals readable by a machine, for controlling the operation of a computer according to the method of the invention and/or to structure its components in accordance with the system of the invention.

Further, each step of the method may be executed on any general computer, such as IBM Systems designated as zSeries, iSeries, xSeries, and pSeries, or the like and pursuant to one or more, or a part of one or more, program elements, modules or objects generated from any programming language, such as C++, Java, Pl/1, Fortran or the like. And still further, each said step, or a file or object or the like implementing each said step, may be executed by special purpose hardware or a circuit module designed for that purpose.

Accordingly, the scope of protection of this invention is limited only by the following claims and their equivalents.

The invention claimed is:

1. A method for generating a user interface, comprising:
   initializing a place server by loading a java virtual machine, instantiating a java server object, and executing said java server object to initialize java statics, quickplace object model, an extensible markup language parser, and an extensible stylesheet language transformations engine;
   responsive to user request, presenting at a browser interface a plurality of predefined user interface themes, each said theme including a cascading style sheet and a predetermined set of layout files, with a layout file for each of a plurality of view modes of operation, each said layout file specifying content and layout of a plurality of skin components, said cascading style sheet including a common style sheet and a skin style sheet, said common style sheet specifying font, size and color style for said skin components common to each of said view modes of operation;
   responsive to end user selection, instantiating a skin by applying a user selected theme to said user interface including a customize theme selector;
   responsive to said user selecting said customize theme selector and modifying data source and formatting logic including changes to specific classes of said common style sheet for said user selected theme, building in a text file said data source and formatting logic; feeding said changes to said common style sheet; and uploading said theme to said collaboration space;
   binding said text file to said skin;
   responsive to command from said end user, dynamically uploading said skin from a user terminal to said place server;
   processing and storing said skin in a place database;
   responsive to end user request, selecting and rendering said user interface in accordance with said skin; and
   said interface logic including an object oriented class for retrieving extensible markup language for processing said skin component, and further including an extensible stylesheet language markup.

2. The method of claim 1, said style sheet component specifying one of a plurality of skin components comprising a theme.

3. The method of claim 1, further comprising terminating said place server by closing all skin components, closing all producers, deleting said java server, and deleting said java virtual machine.

4. The method of claim 3, further comprising receiving at said java server a user request, authenticating said request, opening said database, a view, and a document, loading a skin component, and processing said skin component to hypertext markup language using context selectively for processing forms, processing subforms, and processing skin components, and rendering said hypertext markup language at said client as a skin.

5. The method of claim 4, said context selectively being a skin method for document read, document edit, folder list, headline folder, or slide show folder for a theme.

6. The method of claim 4, said processing skin components including:
  creating and populating a skin component request;
  creating and populating a skin component response;
  searching for a requested skin component and if found processing said skin component;
  responsive to successfully processing said skin component, finding and processing a next skin component until all skin components have been found and processed.

7. The method of claim 6, processing a skin component comprising finding an instance of said skin component in cache; if found, producing, transforming and serializing resulting extensible markup language; and if not found, creating and adding a required skin component to cache.

8. System for generating a user interface, comprising:
  means for initializing a place server by loading a java virtual machine, instantiating a java server object, and executing said java server object to initialize java statics, quickplace object model, an extensible markup language parser, and an extensible stylesheet language transformations engine;
  means responsive to user request for presenting at a browser interface a plurality of predefined user interface themes, each said theme including a cascading style sheet and a predetermined set of layout files, with a layout file for each of a plurality of view modes of operation, each said layout file specifying content and layout of a plurality of skin components, said cascading style sheet including a common style sheet and a skin style sheet, said common style sheet specifying font, size and color style for said skin components common to each of said view modes of operation;
  means responsive to end user selection for instantiating a skin by applying a user selected theme to said user interface including a customize theme selector;
  means, responsive to said user selecting said customize theme selector and modifying data source and formatting logic including changes to specific classes of said common style sheet for said user selected theme, for building in a text file said data source and formatting logic, feeding said changes to said common style sheet, and uploading said theme to said collaboration space;
  means for binding said text file to said skin;
  means responsive to command from said end user for dynamically uploading said skin from a user terminal to said place server;
  means for processing and storing said skin in a place database;
  means responsive to end user request for selecting and rendering said user interface in accordance with said skin; and
  said interface logic including an object oriented class for retrieving extensible markup language for processing said skin component, and further including an extensible stylesheet language markup.

9. A program storage device readable by a machine, tangibly embodying a program of instructions executable by a machine to perform method steps for generating a user interface, said method comprising:
  initializing a place server by loading a java virtual machine, instantiating a java server object, and executing said java server object to initialize java statics, quickplace object model, an extensible markup language parser, and an extensible stylesheet language transformations engine;
  responsive to user request, presenting at a browser interface a plurality of predefined user interface themes, each said theme including a cascading style sheet and a predetermined set of layout files, with a layout file for each of a plurality of view modes of operation, each said layout file specifying content and layout of a plurality of skin components, said cascading style sheet including a common style sheet and a skin style sheet, said common style sheet specifying font, size and color style for said skin components common to each of said view modes of operation;
  responsive to end user selection, instantiating a skin by applying a user selected theme to said user interface including a customize theme selector;
  responsive to said user selecting said customize theme selector and modifying data source and formatting logic including changes to specific classes of said common style sheet for said user selected theme, building in a text file said data source and formatting logic; feeding said changes to said common style sheet; and uploading said theme to said collaboration space;
  binding said text file to said skin;
  responsive to command from said end user, dynamically uploading said skin from a user terminal to said place server;
  processing and storing said skin in a place database;
  responsive to end user request, selecting and rendering said user interface in accordance with said skin; and
  said interface logic including an object oriented class for retrieving extensible markup language for processing said skin component, and further including an extensible stylesheet language markup.

10. The program storage device of claim 9, said method further comprising terminating said place server by closing all skin components, closing all producers, deleting said java server, and deleting said java virtual machine.

11. The program storage device of claim 10, said method further comprising receiving at said java server a user request, authenticating said request, opening said database, a view, and a document, loading a skin component, and processing said skin component to hypertext markup language using context selectively for processing forms, processing subforms, and processing skin components, and rendering said hypertext markup language at said client as a skin.

12. The program storage device of claim 11, said context selectively being a skin method for document read, document edit, folder list, headline folder, or slide show folder for a theme.

13. The program storage device of claim 11, said processing skin components including:
  creating and populating a skin component request;
  creating and populating a skin component response;

searching for a requested skin component and if found processing said skin component;

responsive to successfully processing said skin component, finding and processing a next skin component until all skin components have been found and processed.

14. The program storage device of claim 13, said processing a skin component comprising finding an instance of said skin component in cache; if found, producing, transforming and serializing resulting extensible markup language; and if not found, creating and adding a required skin component to cache.

\* \* \* \* \*